United States Patent Office 2,773,852
Patented Dec. 11, 1956

2,773,852

PRODUCTION OF ANTI-STATIC PLASTICS

Richard G. Rowe, Redding Ridge, and Guiles Flower, Jr., Darien, Conn., assignors to Dictaphone Corporation, Bridgeport, Conn., a corporation of New York No Drawing. Original application December 9, 1950, Serial No. 200,094. Divided and this application March 5, 1953, Serial No. 340,672

9 Claims. (Cl. 260—32.6)

This invention relates to the production of anti-static plastics and more particularly to anti-static agents adapted to be incorporated in vinylic resins to form anti-static plastics suitable for the production of phonograph records, as well as to anti-static plastics and phonograph records containing said agents.

This application is a division of my prior pending application Serial No. 200,094, filed December 9, 1950, now abandoned. The claims of the present application are directed to a composition comprising a vinylic resin and an anti-static agent, whereas the claims of the prior application are directed to the anti-static agent per se.

In recent years there has been a rapid increase in the use of vinyl resins for the manufacture of phonograph records, particularly the so-called long-playing records. The vinyl resins possess a number of properties which make them exceptionally useful in the manufacture of such records. However, they are subject to one quite serious disadvantage namely, their tendency to attract dust, presumably due to the accumulation of static electrical charges on the surface of the record. The dust works its way into the grooves of the records from which it is very difficult to remove. An accumulation of dust and grit remaining in the grooves increases the noise level and tends to produce an abrasive action on the record grooves, thereby causing undue wear of the grooves and distortion of the sound reproduction.

It is an object of the present invention to provide an anti-static plastic composed predominantly of a vinyl resin and adapted to be used in making phonograph records having no tendency to attract dust particles due to accumulated electrical charges on the surface thereof. It is another object of the invention to provide a group of anti-static agents adapted to be incorporated in minor amounts in vinyl resins to confer anti-static properties thereon. It is still another object of the invention to provide a group of compounds which are compatible with a copolymer of vinyl chloride and vinyl acetate when incorporated therein in an amount sufficient to render the copolymer anti-static. It is a still further object of the invention to provide a group of new chemical compounds which, when incorporated in a vinyl resin, confer anti-static properties thereon. Other objects of the invention will be in part obvious and in part pointed out hereafter.

We have found that a vinyl resin molding composition may be rendered substantially anti-static and at the same time the sound recording properties of a phonograph record molded therefrom may be substantially retained by including in the composition a minor proportion, say 2–10% of a monoamide of a straight-chain hydroxy acid. In particular, we have found that various amine salts and amides of lactic acid, ricinoleic acid and 12 hydroxystearic acid are capable of conferring a useful degree of anti-static properties on a copolymer of vinyl chloride and vinyl acetate. Both aliphatic and aromatic amine salts and amides of these acids have been found operative. Thus it has been found that N-cyclohexyl ricinoleamide, N-cyclohexyl lactamide, N-2-hydroxyethyl lactamide, N-piperidyl lactamide, N-n-butyl ricinoleamide, N-ethyl ricinoleamide, N-ethyl lactamide, N-2-hydroxyethyl ricinoleamide, N-2-methyl 2-hydroxyethyl lactamide, N-2-methyl-2-hydroxyethyl ricinoleamide, N-2-methyl-2-hydroxyethyl 12-hydroxy stearamide, N-2-hydroxyethyl 12-hydroxy stearamide and the corresponding amine salts are capable of conferring significant anti-static properties on vinyl resins in which they are incorporated. While all of the foregoing compounds produce a measurable anti-static effect when incorporated in a vinyl resin, preferred results are obtained with the N-alkanol amides of the straight-chain hydroxy acids and within this sub-group best results have been achieved by using N-2-hydroxyethyl ricinoleamide.

The amide may be incorporated in the resin in any of various ways. Ordinarily the record-molding composition contains minor proportions of various constituents in addition to the resin. For example, the molding composition may contain waxes, metallic soaps, coloring matter and the like. In accordance with one commonly used procedure the components of the molding composition are blended in powder form in a ribbon blender or tumbling drum and thereafter transferred to a Banbury mixer wherein they are heated and milled for a further period to convert them into a homogenous mixture. The mixture is removed from the Banbury mixer in a plastic condition at a temperature of the order of 120° C. to 180° C. and then formed into sheets or ribbons, cooled and broken up into granules which are subsequently used for molding the record.

The anti-static agent of the present invention may be added to the powdered vinyl resin in the blender prior to, during, or after the addition of the other components of the molding composition, or it may be added to the other materials in the Banbury mixer or milled into the molding composition after the other ingredients have been incorporated therein. Also the resin and anti-static agents can be dissolved in a suitable solvent such as acetone and the solvent evaporated to give the desired mixture of resin and anti-static agent. In cases where the anti-static agent is added in the form of an amine salt it is probably converted to the amide during the course of the blending operation, and hence the processed resin probably contains the anti-static agent in amide form whether or not it is originally added in the amide form.

It has been found that the optimum proportion of anti-static compound to be used is largely determined by what may be called the point of incipient incompatibility. In general, the present compounds are compatible with the resin to the extent of say 3%–6% by weight of the resin depending upon the particular compound used. It has been found desirable to use a quantity of the anti-static compound that is just below the point of incipient incompatibility, that is, the maximum amount of the compound that can be compatibly blended with the molding composition. In most cases this amount falls between 3% and 6% by weight of the resin.

In order to point out more fully the nature of the present invention, the following specific examples are given:

*Example 1.—N-2-hydroxyethyl ricinoleamide*

A mixture is prepared containing 300 grams of castor oil fatty acids and 67 grams of monoethanolamine, the proportion of the amine being about 10% in excess of that stoichiometrically required. The mixture is heated at 150° C. for three hours to produce the desired N-2-hydroxyethyl ricinoleamide, removing about 23 grams of distillate in the process. At the end of this period the reaction product is poured into a flat, shallow pan and allowed to harden.

The product as thus prepared is an off-white waxy semi-solid which may be purified by recrystallization from solvents such as ethyl acetate, acetone or methyl ethyl ketone. Recrystallization from a ketone type of medium is preferred. The product obtained by a single recrystallization is satisfactory for use as an anti-static agent. Upon repeated recrystallization, a product is obtained having a melting point of 58°–59° C.

The N-2-hydroxyethyl ricinoleamide as thus prepared is incorporated in a vinyl molding composition in the following manner: 100 lbs. of a copolymer containing 87% vinyl chloride and 13% vinyl acetate and in finely divided form is placed in a ribbon blender and 5 lbs. of the N-2-hydroxyethyl ricinoleamide is added to the blender and mixed therein with the vinyl resin for a period of about ten minutes. At this time 1.5 lbs. of fused lead stearate and 2.0 lbs. of oiled carbon black are added and mixing continued for another ten minutes.

Upon completion of the mixing, the batch is transferred to a Banbury mixer and milled for approximately eight minutes. The mixer is heated to a temperature sufficient to fuse the mixture and cause it to attain a temperature of 130° C.–140° C. Upon removal from the Banbury mixer the material is passed four times through a two-roll even-speed mill, after which the material is sheeted out on a cooling belt in the form of a continuous ribbon one-quarter inch thick. The ribbon is cooled with air at an average temperature of 10°–15° C. After cooling the material is broken into small slabs and then ground in a Ball and Jewell cutter which granulates it to produce molding particles having a size up to three-eighths inch. If desired, the granulated material can be passed over Alnico magnets to remove any tramp metal which may be present.

The resulting molding composition can be molded into phonograph record blanks in the usual manner, and phonograph records made therefrom will be found to have substantially no attraction for dust particles.

*Example 2.—N-2-methyl-2-hydroxyethyl 12-hydroxystearamide*

A mixture is prepared of 300 grams of 12-hydroxystearic acid and 83 grams of monoisopropanolamine (10% excess amine). The mixture is refluxed for three hours at 150° C. removing 26 grams of distillate to form N-2-methyl-2-hydroxyethyl 12-hydroxy stearamide and the product is then poured into a flat, shallow pan to solidify.

The resulting product is an off-white, waxy solid which may be purified by recrystallization from ethyl acetate, acetone or methyl ethyl ketone, a ketone type of medium being preferred. One recrystallization is satisfactory to produce a product useful as an anti-static agent. Upon repeated recrystallization a product is obtained having a melting point of 102.5°–103.5° C.

The amide as thus prepared may be incorporated in a vinyl resin as in Example 1 to produce a product on which static charges do not build up in ordinary use.

*Example 3.—N-2-hydroxy-2-methyl-ethyl lactamide*

A mixture is prepared of 106 grams of 85% lactic acid and 83 grams (10% excess amine) of monoisopropanolamine. The mixture is heated under reflux for three hours at a temperature of approximately 150° C. At the end of this period 37 grams of the product are removed by distillation and the remaining material is crude N-2-hydroxy-2-methyl-ethyl lactamide which may be further purified by distillation if desired, but can be used without further distillation as an anti-static agent and incorporated in a vinyl resin in accordance with the procedure of Example 1. The purified amide is a viscous water-white liquid.

*Example 4. N-n-butyl ricinoleamide*

A mixture is prepared containing 300 grams of castor oil fatty acids and 80 grams (10% excess amine) of n-butyl amine. The mixture is heated under reflux for four hours at a temperature of 150° C. and then 25 grams of product are removed by distillation.

The resulting crude N-n-butyl ricinoleamide, which may have a color varying from yellow to dark red is purified by distilling under vacuum. The purified product is a pale yellow liquid having a boiling range of 260–262° C. at 8 mm. Either the crude product or the purified product may be used as an anti-static agent.

*Example 5.—N-piperidyl lactamide*

A mixture is prepared of 106 grams of 85% lactic acid and 85 grams of piperidine. The mixture is refluxed for two hours to cause the amine and lactic acid to react to form the lactamide. A first fraction of 34 ml. is removed by distillation and the remainder of the product then distilled through a Liebig condenser. The middle fraction of the distillate having a boiling range of 141–145° C. at 15 mm. is segregated as N-piperidyl lactamide, and when cooled to room temperature is a viscous colorless liquid. The product may be incorporated in the resin as in Example 1.

*Example 6.—N-2-hydroxyethyl lactamide*

A mixture is prepared of 106 grams of 85% lactic acid and 67 grams (10% excess amine) of monoethanolamine. The mixture is prepared by adding the monoethanolamine to the lactic acid slowly with stirring. When the addition of the amine is complete, the reaction mixture is heated under reflux for two hours at a temperature of 135°–140° C. At the end of this time, 41 grams of the product are removed by distillation. The remaining material is crude N-2-hydroxyethyl lactamide which may be used as such as an anti-static agent, or may be purified by fractional distillation. The product is a straw-colored liquid.

*Example 7.—N-2-hydroxyethyl 12-hydroxystearamide*

A mixture is prepared of 300 grams of commercial 12-hydroxystearic acid and 67 grams (10% excess amine) of monoethanolamine. The mixture is heated under reflux for three hours at 150° C. At the end of this period, after removal of 26 grams of distillate, the reaction product, which is crude N-2-hydroxyethyl 12-hydroxystearamide, is poured into a flat, shallow pan and allowed to solidify.

The reaction product is an off-white waxy solid which may be purified by recrystallization from such solvents as ethyl acetate, acetone or methyl ethyl ketone. As in the case of Example 1 a ketone type solvent is preferred. The product of a single recrystallization may be used satisfactorily as an anti-static agent. The product obtained by repeated recrystallization has a melting point of 106.5°–108° C.

*Example 8.—N-cyclohexyl ricinoleamide*

A mixture is prepared of 544.5 grams of U. S. P. castor oil and 162 grams of cyclohexylamine. The mixture is heated under reflux for five hours at a temperature of 180° C.–200° C. At the end of this period the crude N-cyclohexyl ricinoleamide is poured into a shallow, flat pan and permitted to solidify.

The crude product is dissolved in hot acetone and while the solution is still hot, water is added until the solution becomes slightly cloudy. Thereafter the solution is heated until it becomes clear and then chilled to cause the product to separate out. The separated product is a white, waxy solid having a melting point of 51°–52.8° C.

*Example 9.—N-2-methyl-2-hydroxyethyl ricinoleamide*

A mixture is prepared containing 300 grams of castor oil fatty acids and 80 grams of mono-isopropanolamine. The quantity of amine used is about 5 grams in excess of that theoretically required. The mixture is refluxed for one hour and then 18 grams of distillate is removed by means of a Dean Stark moisture trap inserted between the reaction vessel and reflux condenser.

The resulting reaction product is dissolved in toluene and chilled to yield the ricinoleamide as a solid having a melting point of 12°–14° C.

Example 10.—N-ethyl ricinoleamide 600 grams of castor oil fatty acids is placed in a reaction vessel surrounded by an ice bath. 100 grams of chilled anhydrous ethylamine is slowly added by means of a dropping funnel. The reaction products are stirred for approximately 30 minutes while surrounded by the ice bath and then the ice bath is removed and the reaction mixture allowed to come to room temperature. Thereafter the mixture is heated to boiling to remove the water of the reaction from the mixture.

The crude reaction product is vacuum distilled through a Liebig condenser and the N-ethyl ricinoleamide recovered as fraction having a boiling point of 244°–245° C. at 6 mm. The product is a light yellow, viscous oil.

Either the crude product or the refined product can be used as an anti-static agent.

Example 11.—Cyclohexylamine ricinoleate

A mixture is prepared of 149.25 grams of commercial ricinoleic acid and 50 grams of cyclohexylamine. The mixture is stirred for one hour at 88°–93° C., to produce the crude ricinoleate.

The crude product is charged to a vacuum distillation unit and chilled under reduced pressure. The cyclohexylamine ricinoleate is recovered as a fraction boiling between 254° and 256° C. at 50 mm. At room temperature the product partially solidifies to a white oily solid. It is soluble in benzene, ethyl acetate and acetone but insoluble in water and methanol.

Example 12.—Monoethanolamine lactate 61 grams of mono-ethanolamine is slowly added with stirring to 105 grams of 85% lactic acid. The resulting reaction mixture is heated for one hour at 80° C. and then 15 grams of the material removed by distillation.

The resulting crude reaction product is charged to a vacuum distillation unit and distilled. The mono-ethanolamine lactate is recovered as a fraction boiling at about 186° C. at a pressure of 43 mm. The product is a light yellow, viscous liquid soluble in ethyl, alcohol, acetone and water but insoluble in benzene and kerosene.

Example 13.—Piperidine lactate 85 grams of piperidine is added dropwise with stirring to a flask containing 100 grams of 85% lactic acid.

During the addition of the amine the reaction temperature is kept below 95° C. The resulting reaction mixture is in reflux for two hours.

Thereafter the reaction product is distilled through a Liebig condenser at reduced pressure. The piperidine lactate is recovered as a fraction boiling at about 140° C. at a pressure of 15 mm. The product is highly viscous and does not crystallize at room temperature. It should be kept stoppered and protected from light.

Example 14.—Ethylamine lactate 100 grams of anhydrous ethylamine is added with stirring to a reaction vessel containing 211 grams of 85% lactic acid and cooled by an ice bath. After the addition of the amine is complete the reaction mixture is allowed to come to room temperature and stirred for one hour.

The resulting crude reaction product is distilled at reduced pressure through a Liebig condenser, and the ethylamine lactate recovered as a fraction boiling between 159° and 161° C. at 17 mm. The product is a water-white oily liquid soluble in water, ethanol, ethyl acetate and acetone but insoluble in toluene and kerosene.

Example 15.—N-butylamine ricinoleate

To 300 grams of commercial ricinoleic acid, 80 grams (10 percent excess by weight) of n-butylamine is added dropwise with stirring from a dropping funnel. When all of the amine has been added, the reaction mixture is stirred for two hours at about 100° C.

The resulting reaction mixture is distilled at reduced pressure through a Liebig condenser and the n-butylamine ricinoleate recovered as a fraction boiling from 240° to 241° C. at 17 mm. The product is a water-white viscous liquid soluble in ethanol, acetone and ethyl acetate, but insoluble in water.

Example 16.—Ethylamine ricinoleate 600 grams of commercial ricinoleic acid is placed in a reaction vessel surrounded by an ice bath. 100 grams of chilled anhydrous ethylamine is slowly added to the ricinoleic acid by means of a dropping funnel. The reaction products are stirred for approximately 30 minutes while surrounded by the ice bath; then the ice bath is removed and the mixture allowed to come to room temperature with continued stirring. Thereafter the reaction mixture is heated without stirring for two hours at approximately 110° to 115° C.

The crude reaction mixture thus prepared is distilled through a Liebig condenser at reduced pressure. The ethylamine ricinoleate is recovered as a fraction having a boiling point of 231° C. at 8 mm. pressure. This product is a light yellow oily liquid at room temperature and is soluble in water, ethanol, toluene and ethyl acetate.

Example 17.—Mono-ethanolamine ricinoleate

A mixture is prepared of 300 grams of castor oil fatty acids and 65 grams of mono-ethanolamine. The mixture is heated with stirring for two hours at about 100° C.

The resulting crude reaction product is dissolved in acetone and then chilled to a temperature below −7° C. whereupon a white solid separates that may be recovered by vacuum filtration. Residual traces of acetone may be removed from the solid by careful heating at low temperatures. The resultant product is a soft, light colored solid having a melting point of 49° C. It is soluble in ethanol, acetone, toluene and ethyl acetate and difficultly soluble in water.

Example 18.—Mono-ethanolamine 12-hydroxy-stearate

A mixture is prepared of 33 grams of mono-ethanolamine (5% excess), 150 grams of 12-hydroxy-stearic acid and 300 grams of toluene. The mixture is refluxed for 1 hour at about 110° C. At the end of this period the toluene is removed by distillation and the reaction product is poured into a flat shallow pan to solidify.

The crude reaction product thus prepared is an off-white, waxy solid. It may be recrystallized from toluene, acetone, methyl ethyl ketone or ethyl acetate to obtain a product which has a melting point of 75°–77° C. In addition to the recrystallizing solvents mentioned, it is soluble in ethanol, butanol and dibutyl phthalate but insoluble in water and kerosene.

Example 19.—Mono-isopropanolamine 12-hydroxy-stearate

A mixture is prepared containing 83 grams (5% excess) of mono-isopropanolamine, 150 grams of 12-hydroxystearic acid and 300 grams of toluene as a solvent. The mixture is refluxed for one hour at about 110° C. and the toluene then removed by distillation. The remaining mixture is poured into a flat shallow pan to solidify.

The crude reaction product is an off-white, waxy solid that may be purified by recrystallization from ethyl acetate, acetone, methyl ethyl ketone or toluene. Recrystallization of the product from toluene yields a product which has a melting point of 82°–83° C. In addition to being soluble in the recrystallizing solvents mentioned, the product is soluble in ethanol, butanol, dibutyl phthalate and water.

It is, of course, to be understood that the foregoing detailed procedures are illustrative only and that numerous changes may be made therein without departing from the scope of the invention. As indicated above, the molding composition may contain waxes, metal soaps, dyes, pigments and the like. In general the minor ingredients of the molding composition other than the anti-static agent may be varied as desired and in accordance with the knowledge of the art, provided that these minor constituents are not so varied as to render the anti-static agent incompatible with the resin or so nearly incompatible as to render the anti-static effect insufficient. As previously indicated, the preferred agent for copolymers of vinyl chloride and vinyl acetate is N-2-hydroxyethyl ricinoleamide. It has been found that other alkanolamides of hydroxy acids such as N-2-hydroxy-2-methyl ethyl ricinoleamide and N-2-hydroxyethyl 12-hydroxy-stearamide are nearly as effective as N-2-hydroxyethyl ricinoleamide, whereas compounds such as ethyl lactamide, wherein the alkyl group of the amide contains no hydroxy group, although operative to produce an anti-static effect, are somewhat less effective than the alkanolamides.

The term vinylic resin as used herein is intended to comprehend polymers derived from aliphatic vinylic monomers such as the vinylidene polyvinyl and vinyl acetal resins, as well as the vinylic copolymers referred to above.

Since many embodiments might be made of the present invention and since many changes might be made in the embodiments disclosed herein, it is to be understood that the foregoing description is to be interpreted as illustrative only and not in a limiting sense.

What is claimed is:

1. An anti-static plastic adapted to be used in the production of phonograph records, said plastic being essentially composed of a copolymer of vinyl chloride and vinyl acetate and containing from 2% to 10% by weight of a mono-alkanol amide of a straight-chain monocarboxylic hydroxy acid as an anti-static agent.

2. An anti-static plastic adapted to be used in the production of phonograph records, said plastic being essentially composed of a copolymer of vinyl chloride and vinyl acetate and containing a minor proportion of N-2-hydroxyethyl ricinoleamide.

3. An anti-static plastic adapted to be used in the production of phonograph records, said plastic being essentially composed of a copolymer of pinyl chloride and vinyl acetate and containing a minor proportion of N-2-hydroxy-2-methylethyl ricinoleamide.

4. An anti-static plastic adapted to be used in the production of phonograph records, said plastic being essentially composed of a copolymer of vinyl chloride and vinyl acetate and containing a minor proportion of N-2-hydroxyethyl 12-hydroxystearamide.

5. An anti-static plastic adapted to be used in the production of phonograph records, said plastic being essentially composed of a copolymer of vinyl chloride and vinyl acetate and containing a minor proportion of N-2-hydroxyethyl lactamide.

6. An anti-static plastic adapted to be used in the production of phonograph records, said plastic being essentially composed of a copolymer of vinyl chloride and vinyl acetate and containing N-2-hydroxyethyl ricinoleamide, the proportion of said ricinoleamide being just under that amount which produces incipient incompatibility of said ricinoleamide in said copolymer.

7. An anti-static plastic adapted to be used in the production of phonograph records, said plastic being essentially composed of a copolymer of vinyl chloride and vinyl acetate and containing from about 2% to 10% by weight of N-2-hydroxyethyl ricinoleamide.

8. A phonograph record composed of a plastic essentially composed of a co-polymer of vinyl chloride and vinyl acetate and contains from 2% to 10% by weight of a monoalkanol amide of a straight-chain monocarboxylic hydroxy acid as an anti-static agent.

9. A phonograph record composed of a plastic that is essentially composed of a copolymer of vinyl chloride and vinyl acetate containing a minor proportion of N-2-hydroxyethyl ricinoleamide.

References Cited in the file of this patent
UNITED STATES PATENTS

| | | |
|---|---|---|
| 1,986,854 | Reid | Jan. 8, 1935 |
| 2,250,664 | Watkins | July 29, 1941 |